United States Patent [19]
Otto et al.

[11] 3,933,228
[45] Jan. 20, 1976

[54] BRAKE DISK CONSTRUCTION

[75] Inventors: Alfred Otto; Hans Zeuner, both of Remscheid, Germany

[73] Assignee: Bergische Stahl-Industrie, Stuttgart, Germany

[22] Filed: Feb. 7, 1974

[21] Appl. No.: 440,467

[52] U.S. Cl. .................................. 188/218 X L
[51] Int. Cl.² .................................. F16D 65/12
[58] Field of Search ....... 188/218 XL, 73.1; 74/450, 74/230.11

[56] References Cited
FOREIGN PATENTS OR APPLICATIONS

| | | | |
|---|---|---|---|
| 35,473 | 2/1965 | Germany | 188/218 X L |
| 1,130,463 | 10/1968 | United Kingdom | 188/218 X L |
| 1,244,834 | 7/1967 | Germany | 188/218 X L |
| 1,069,555 | 5/1967 | United Kingdom | 188/218 X L |
| 1,080,035 | 8/1967 | United Kingdom | 188/218 X L |
| 234,753 | 12/1963 | Austria | 188/218 X L |

*Primary Examiner*—Trygve M. Blix
*Assistant Examiner*—Edward R. Kazenske
*Attorney, Agent, or Firm*—Michael J. Striker

[57] ABSTRACT

A hub unit is adapted to be connected to a vehicle wheel or axle for rotation therewith. A circular brake ring unit surrounds the hub unit and is divided into at least two parts located at opposite sides of the axis of the circular brake ring unit. Connecting elements dismountably mount the brake ring unit on the hub unit by releasably connecting together the two or more parts of the brake ring unit, whereby to permit separation of the parts of the brake ring unit to facilitate dismounting of the brake ring unit from the hub unit.

7 Claims, 2 Drawing Figures

BRAKE DISK CONSTRUCTION

BACKGROUND OF THE INVENTION

The present invention relates to brake disk constructions, for example of the type disclosed in German Pat. No. 1,222,962. Users of this known construction have more and more required easy removal of the brake disk from the disk brake arrangement for purposes of replacement of worn disks, but without having to completely remove the vehicle wheels to gain access to brake disks located behind the vehicle wheels, or without having to completely remove the hub units on which the brake ring units may be mounted.

SUMMARY OF THE INVENTION

It is the general object of the invention to provide a brake disk construction in which the brake disk can be removed from the disk brake arrangement in a very simple manner without the need to first remove the vehicle wheels behind which the worn brake disks to be replaced are located.

This object, and others which will become more understandable from the following description of a preferred embodiment, can be met, according to one advantageous concept of the invention, by providing a brake disk construction which includes a hub unit adapted to be connected to a vehicle wheel for rotation therewith. A circular brake ring unit surrounds the hub unit and is divided into at least two parts located at opposite sides of the axis of the circular brake ring unit. Connecting means dismountably mounts the brake ring unit on the hub unit by releasably connecting together the just-mentioned parts of the brake ring unit, whereby to permit separation of such parts of the brake ring unit to facilitate dismounting of the brake ring unit from the hub unit.

The principal advantage of this construction is that the hub unit can be left mounted on the vehicle wheel or axle during replacement of a worn brake disk mounted on the hub unit. This is in contrast to the prior-art practice of forcing the hub unit off the vehicle wheel or axle for the purpose of replacement of the worn brake disk.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
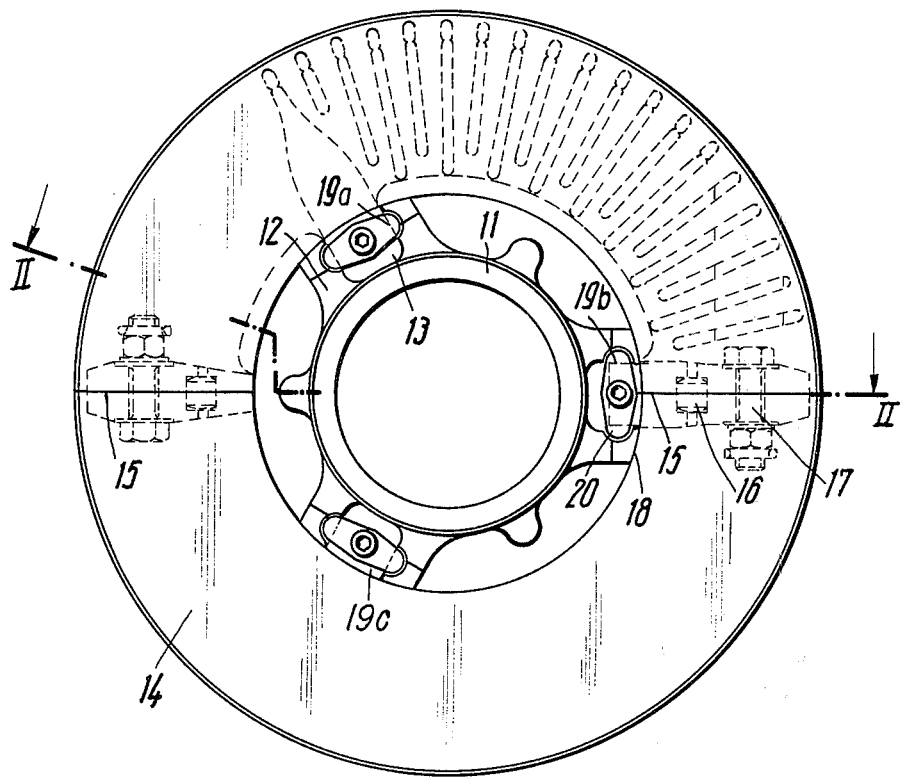
FIG. 1 is a front view of a brake disk arrangement according to the invention.
Figure 2:
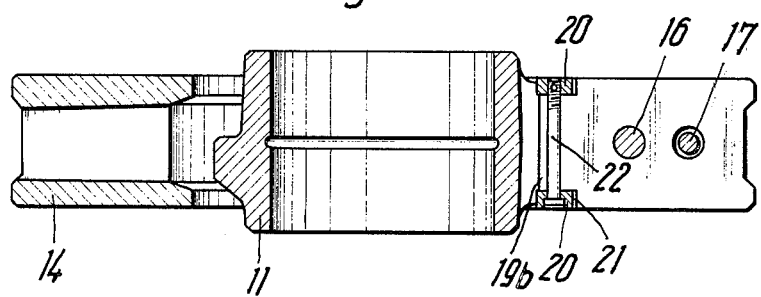
FIG. 2 is a section taken along line II—II of FIG. 1.

The construction illustrated in FIGS. 1 and 2 is comprised of a central hub unit 11 adapted to be mounted on the axle of a vehicle wheel. The hub unit 11 is comprised of three equi-angularly spaced carrier arms 12 of generally fork-shaped configuration. Each carrier arm 12 is provided with an axially extending recess 13. The hub unit 11 is formed from a material of high toughness and has an inner diameter so selected that the hub unit 11 is mounted on the vehicle wheel axle by means of force-fitting.

The brake ring unit 14 is comprised of two axially spaced annular disk-shaped sections. The two disk-shaped sections are joined together by radially extending air guide ribs which define radially extending cooling passages (see FIG. 1) open at both their radially inner and radially outer ends, for the passage of cooling air in radial direction through the space between the axially spaced annular disk-shaped sections.

The brake ring unit 14 is divided along a radial plane into two halves having facing and abutting surface portions meeting along the seam lines 15 located in the just-mentioned radial plane. The material of the brake ring unit 14 is of low elasticity, but of high wear-resistance, for example cast iron.

The brake ring unit 14 is provided with three equi-angularly offset radially inwardly projecting mounting projections 19a, 19b, 19c. These projections are received and wedged in the axially extending receiving recesses 13, i.e., between the two prongs of each of the fork-shaped carrier arms 12. In this way, the brake ring unit 14 is mounted on the hub unit 11.

Each of the axially extending receiving recesses 13, at the radially outermost portion thereof, is configurated to abut and tightly engage the sides of the radially innermost portion of the respective mounting projection 19. However, the axially extending receiving recesses 13 are each provided at both their axial ends with widened portions 21 into which are inserted wedge members 20 for the purpose of preventing axial shifting of the brake ring unit 14. As seen most clearly in FIG. 2, the two wedge members 20 inserted into the widened portions 21 at the opposite axial ends of the receiving recess 13 are connected together by an axially extending threaded screw 22.

It will be noted that the radial plane (at 15) which bisects the brake ring unit 14 bisects one of the radially inwardly projecting mounting projections, namely the mounting projection 19b. The mounting projection 19b constitutes the radially inward end of a radially extending joining portion, which is likewise bisected. The two halves of the bisected joining portion, each of which is integral with one of the two halves of the brake ring unit 14, are connected together by means of a tangentially extending nut-and-bolt unit 17, the bolt of which passes through both halves of the joining portion. To facilitate proper positioning of the two halves of the joining portion and associated mounting projection 19b relative to each other, use is made of a centering pin 16.

The two halves of the brake ring unit 14 are furthermore connected diametrically opposite the mounting projection 19b by means of structure similar to that just described, but not constituting one of the mounting projections which mount the brake ring unit 14 on the hub unit 11.

According to the invention, it is also possible to similarly bisect, trisect or in other manner subdivide the hub unit 11, to facilitate dismounting, and to similarly mount the thus subdivided hub unit 11 on the vehicle wheel axle, i.e., employing connecting screws and wedge members as shown in the drawing for the connection together of the two halves of brake ring unit 14. If the hub unit 11 is to be subdivided in this manner, care should in general be taken to avoid orientation of the dividing plane such that it would pass through one of the carrier arms 12, since this would tend to reduce the clamping effectiveness of the two prongs of the carrier arm 12.

It will be noted that with this construction the radially inner ends of the radially extending air passages are substantially unobstructed, thereby not interfering with the desired cooling action, and with no excessive reduction in the flow cross-sections of these cooling passages being necessary.

Furthermore, the connecting screw 17, which can also be formed as a necked-down bolt, can advantageously be slightly loosened, this having the advantageous result of causing a slight separation between the two halves of the mounting projection 19b, and thereby a tighter wedging of the projection 19b in the associated receiving recess 13.

Also, the complete screwed-together brake ring unit with the three mounting projections can be worked upon in the same special machine tool as employed for similar undivided brake ring units, so that in conjunction with the clamping action of the hub unit the replacement of worn brake ring units can be performed without special techniques. The contact surfaces between the mounting projections 19a, 19b and the receiving recesses 13 can accordingly be surface-hardened.

Furthermore, axial shifting of the brake ring unit 14 on the hub unit 11 is reliably prevented, due to the combined action of the wedge members 20 and the centering pins 16.

Any rotary imbalances which may occur can be compensated by changing the strength of the radially extending air-guide ribs.

The brake ring unit 14 can according to the invention be subdivided into any desired number of parts, but care should be taken to assure that the dividing plane passes through at least one of the mounting projections in the manner shown with respect to projection 19b.

It will be understood that each of the elements described above, or two or more together, may also find a useful application in other types of constructions differing from the types described above.

While the invention has been illustrated and described as embodied in a brake disk construction for use in disk brake arrangements, particularly for railroad cars, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A brake disk construction, comprising, in combination, a circular hub unit adapted to be connected to a vehicle wheel for rotation therewith and comprised of a plurality of radially outwardly extending angularly spaced carrier arms each comprised of a pair of angularly spaced prong portions defining between themselves a receiving recess; a circular brake ring unit surrounding said hub unit and comprised of angularly spaced radially inwardly projecting mounting projections each clamped between the two prong portions of a respective carrier arm, said brake ring unit being divided along at least one radial plane into at least two parts located at opposite sides of the axis of said circular brake ring unit, each part having surfaces abutting corresponding surfaces of the adjoining part to form radially extending seams located in said at least one radial plane, wherein at least one of said mounting projections constitutes the radially innermost part of a radially extending joining portion forming part of said circular brake ring unit, and wherein said at least one mounting projection and the associated radially extending joining portion are bisected by said radial plane to form two halves each fast with a respective one of said parts of said brake ring unit; and connecting means dismountably mounting said brake ring unit on said hub unit by releasably connecting together said parts of said brake ring unit, whereby to permit separation of said parts of said brake ring unit to facilitate dismounting of said brake ring unit from said hub unit, said connecting means including an elongated connector unit oriented perpendicular to said axis and to said radial plane and passing through and connecting together said two halves of said joining portion, wherein said brake ring unit is comprised of two rigidly connected axially spaced annular disk-shaped sections, and wherein said joining portion and elongated connector unit are located intermediate said two annular disk-shaped sections, wherein said two axially spaced annular disk-shaped sections are joined together by radially extending ribs which define radially extending cooling passages open at both their radially inner and radially outer ends for the flow of cooling air in radial direction through the space between said disk-shaped sections, wherein said receiving recesses and said mounting projections extend in direction axially of said hub unit and of said brake ring unit, wherein said connecting means further includes an elongated centering member parallel to said connector unit and passing through and properly positioning said two halves of said joining portion relative to each other, wherein said connecting means further includes wedge members wedged into the ends of said axially extending receiving recesses to prevent relative axial shifting between said hub unit and said circular brake ring unit, wherein said axially elongated mounting projections are shorter in axial direction than said axially extending receiving recesses, and wherein each axially extending receiving recess has at each of its axial ends a widened portion in which is received and wedged one of said wedge members, and wherein said connecting means further includes a plurality of screws each passing through and connecting together the two wedge members located in a respective one of the receiving recesses.

2. A construction as defined in claim 1, wherein said wedge members are so configurated and oriented in said widened portions of said receiving recesses as to be compressed predominantly in the direction perpendicular both to said axis and to said radial plane.

3. A brake disk construction, comprising, in combination, a circular hub unit adapted to be connected to a vehicle wheel for rotation therewith and comprised of a plurality of radially outwardly extending angularly spaced carrier arms each comprised of a pair of angularly spaced prong portions defining between themselves a receiving recess; a circular brake ring unit surrounding said hub unit and comprised of angularly spaced radially inwardly projecting mounting projections each clamped between the two prong portions of a respective carrier arm, said brake ring unit being divided along at least one radial plane into at least two parts located at opposite sides of the axis of said circular brake ring unit, each part having surfaces abutting corresponding surfaces of the adjoining part to form radially extending seams located in said at least one radial plane, wherein at least one of said mounting projections constitutes the radially innermost part of a radially extending joining portion forming part of said circular brake ring unit, and wherein said at least one mounting projection and the associated radially extending joining portion are bisected by said radial plane to form two halves each fast with a respective one of said parts of said brake ring unit; and connecting means dismountably mounting said brake ring unit on said hub unit by releasably connecting together said parts of said brake ring unit, whereby to permit separation of said parts of said brake ring unit to facilitate dismounting of said brake ring unit from said hub unit, said connecting means including an elongated connector unit oriented perpendicular to said axis and to said radial plane and passing through and connecting together said two halves of said joining portion, wherein said receiving recesses and said mounting projections extend in direction axially of said hub unit and of said brake ring unit, wherein said connecting means further includes wedge members wedged into the ends of said axially extending receiving recesses to prevent relative axial shifting between said hub unit and said circular brake ring unit, wherein said axially elongated mounting projections are shorter in axial direction than said axially extending receiving recesses, and wherein each axially extending receiving recess has at each of its axial ends a widened portion in which is received and wedged one of said wedge members, and wherein said connecting means further includes a plurality of screws each passing through and connecting together the two wedge members located in a respective one of the receiving recesses.

4. A construction as defined in claim 3, wherein said brake ring unit is comprised of two rigidly connected axially spaced annular disk-shaped sections, and wherein said joining portion and elongated connector unit are located intermediate said two annular disk-shaped sections.

5. A construction as defined in claim 4, wherein said two axially spaced annular disk-shaped sections are joined together by radially extending ribs which define radially extending cooling passages open at both their radially inner and radially outer ends for the flow of cooling air in radial direction through the space between said disk-shaped sections.

6. A construction as defined in claim 3, wherein said elongated connector unit is a threaded screw.

7. A construction as defined in claim 3, wherein said connecting means further includes an elongated centering member parallel to said connector unit and passing through and properly positioning said two halves of said joining portion relative to each other.

* * * * *